April 9, 1963  J. B. KUCERA  3,084,493
MATERIAL CUTTING AND CHOPPING APPARATUS
Filed April 11, 1960  2 Sheets-Sheet 1

INVENTOR
JOSEPH B. KUCERA

BY Lowell & Henderson
ATTORNEY

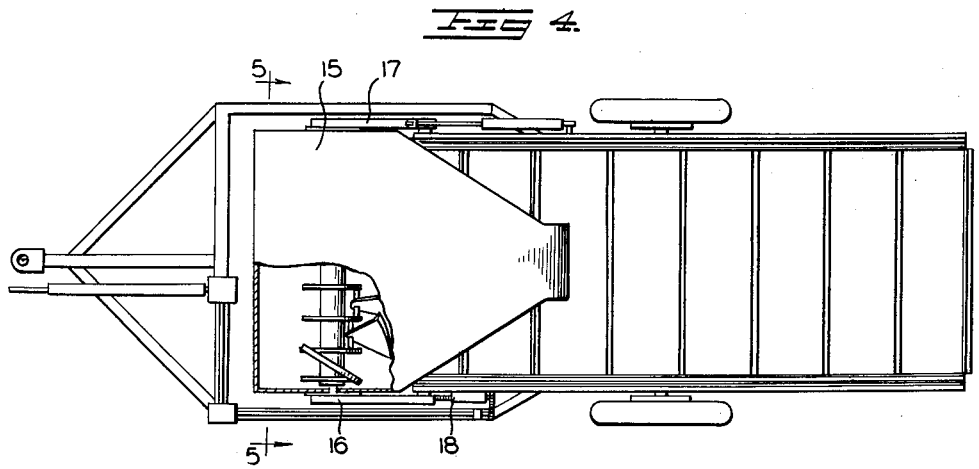
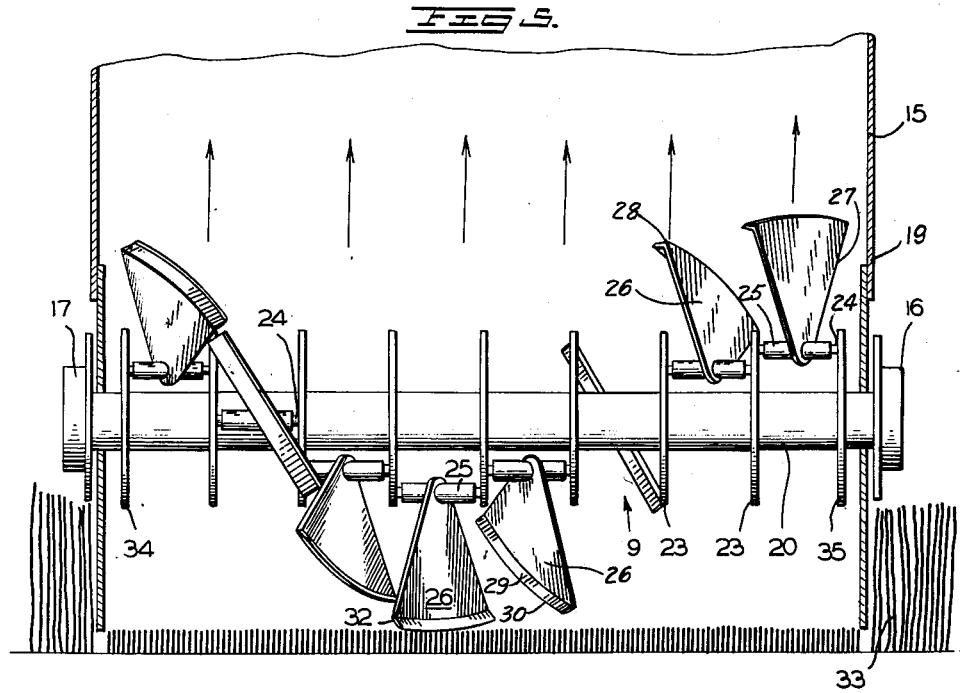

though ed States Patent Office 3,084,493
Patented Apr. 9, 1963

3,084,493
MATERIAL CUTTING AND CHOPPING
APPARATUS
Joseph B. Kucera, Traer, Iowa, assignor of one-third to
Rudolph L. Lowell, Des Moines, and one-third to Eric
M. McElhinney, Dysart, Iowa
Filed Apr. 11, 1960, Ser. No. 21,519
3 Claims. (Cl. 56—24)

This invention relates to hay choppers and loader combinations generally and more specifically is directed to the chopper blade structure for such equipment.

The primary object of this invention is to provide an improved chopper blade structure for hay cutting and loading equipment which utilizes a shearing action to cut grass, wheat, hay or the like.

A specific object of this invention is to provide an improved chopper blade structure wherein standing grain or grass is sheared from the stalk as distinguished from the flaying action of blades of the prior art.

A further object of this invention is to provide a plurality of improved chopper blades arranged in substantially spiral form about a drive assembly with the engagement of the blades on the hay or other grain to be cut being in a shear relationship as distinguished from a flaying or tearing action prevalent in the prior art.

A still further object of this invention is to provide an improved and economical hay chopper blade which is capable of shearing a stem of grain from its root section without tearing the same.

A further obect of this invention is to provide a chopper blade capable of effecting an efficient shearing action on standing grain and simultaneously effecting an efficient lifting and directing effect on the cut grain whereby to cooperate with a loader assembly to convey cut grain into a farm wagon to which the chopper assembly is attached.

Another object of this invention is to provide an improved chopper blade in combination with a chopper drive assembly wherein the connection between the drive assembly and the blade structure at a pivotal mounting therefor is such as to effect a shearing action by the blade on standing grain as the chopper assembly is moved through a field of grain.

With the foregoing and other objects in view, the invention resides in the following specification and appended claims, certain embodiments and details of construction of which are illustrated in the accompanying drawings, in which:

FIGURE 4 is a partially cut-away plan view of the equivalent structure illustrated in FIGURE 1, and FIGURE 5 is an enlarged sectioned view taken along the lines 5—5 of FIGURE 4.

Figure 1:
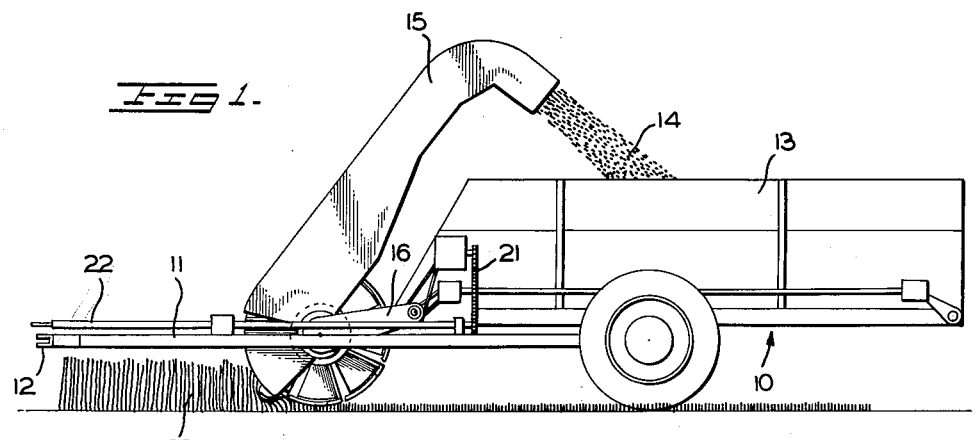
FIGURE 1 is a view in side elevation of a combination hay chopper, loader, and farm wagon to which the invention has been applied.
Figure 2:
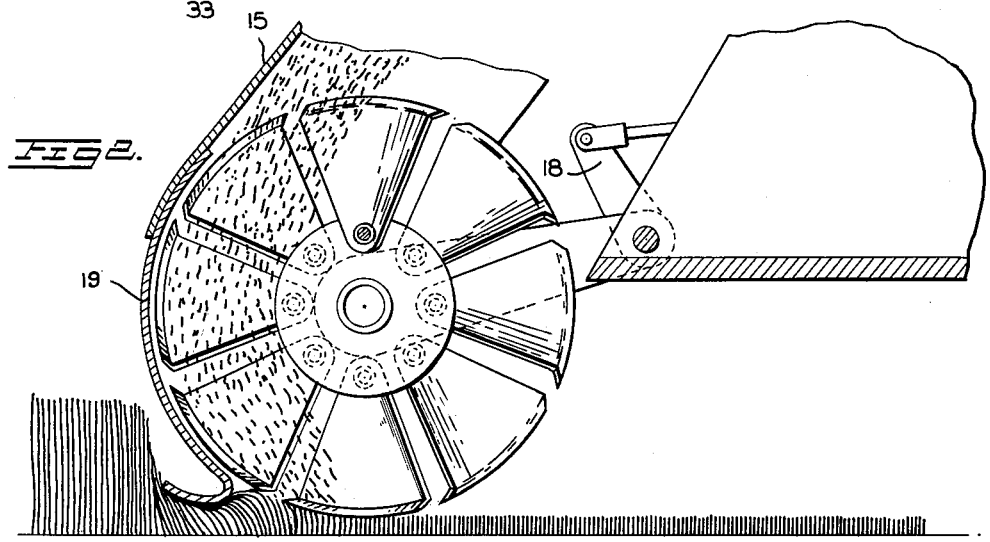
FIGURE 2 is a fragmentary enlarged view of the chopper assembly of FIGURE 1 with certain portions thereof being shown in section.

Referring now more particularly to FIGURE 1, a wagon generally illustrated at 10 includes a draw bar 11, with a forwardly extending clevis member 12 for purposes of attachment to a tow hitch of a traction vehicle (not shown). The wagon 10 includes a body 13 to receive cut grain 14 from a conventional loader 15. The loader assembly is mounted by spaced arms 16 and 17 at the forward end of the wagon 10. The arms 16 and 17 may be suitably adjusted by a mechanism 18 (not forming a part of this invention) whereby to vary the height of a chopper assembly to be described above the ground over which the wagon 10 may be travelling. At the lower end of the loader assembly 15 is positioned an arcuate collector apron 19 whereby, as illustrated in FIGURE 2, grain cut by the chopper assembly will be directed upwardly into the loader assembly 15.

The chopper assembly generally indicated at 9 includes a drive shaft 20 to which is connected suitable gearing 21 through which power is received from a drive shaft 22, which in turn receives its actuation from a power take-off on a traction vehicle (not shown). The drive shaft 20 includes a plurality of spaced mounting plate bracket members 23 which are fixedly secured about the shaft 20 as by welding. Adjacent to the peripheral edge of each plate is provided a tapped hole to agree in alignment with another hole in an adjacent plate 23. Through the aligned spaced holes is directed a stub axle or pivot pin 24, about which is mounted a tubular bearing member 25. The internal diameter of the tubular bearing member 25 is sufficiently larger than the external diameter of the pivot pin 24 that the said tubular member 25 will freely rotate on the pivot pin. Angularly mounted about each tubular bearing member 25 is a chopper plate member 26.

As is clearly illustrated by FIGURES 4 and 5, each set of bracket plates 23 supports one chopper plate 26 in a somewhat offset peripheral position from an adjacent plate such that from one end of the drive shaft 20 to the other the plates 26 are arranged in a reversed spiral formation. In other words, as best appears in FIG. 5, the plates 26 to each side of the longitudinal center of the shaft 20 are of a reversed pitch or inclination, so that the cut material is directed from the ends of the shaft 20 toward the center thereof. The geometry of the mounting is such that the leading edge 27 of any given chopper blade overlaps or substantially aligns with the trailing edge 28 of the adjacent chopper plate so that there is no gap or space between plates during a cutting operation. Stated otherwise a cutting edge, continuous over the length of the shaft 20, is presented to the material to be cut.

Figure 3:
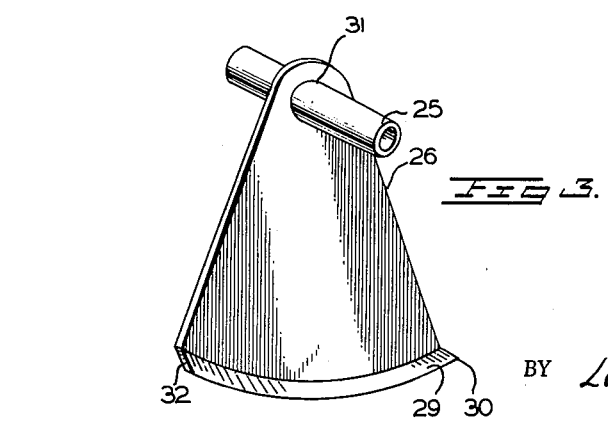
FIGURE 3 is an enlarged detail view in perspective of the improved chopper blade comprising this invention.

By referring to FIGURES 3 and 5 it will be obvious that the chopper blade 26 includes an offset flange or lip 29 which has an outwardly directed edge 30 tapered to form a cutting edge. Each chopper blade 26 is provided with an opening 31 which is directed through the blade at an angle. Therefore, when the blade 26 is welded on the shaft 25 prior to assembly on the pivot pins 24 of the whole chopper assembly, a fixed predetermined angle for the planar surface of the blade 26 relative to the plane of rotation of the chopper assembly 19 is determined.

Now by reference to FIGURE 5 and more particularly to the lowermost blades 26 of that figure, it will become obvious to one skilled in the art that the direction of rotation is such that the lower blades 26 are coming outwardly from the drawing and due to the angular mounting of the blades on the tubular bearing members 25 the leading edge 32 of each flanged section of each chopper blade along with the cutting edge 30 will enter the standing grain 33 in a substantially horizontal plane relative to the ground such that a shearing action will be effected on each piece of such grain 33 as the grain is engaged by the blades 26. By having the blades arranged in spaced offset relationship to constitute the reversed spiral form illustrated in FIGURE 5 a swath of grain will be cut which will be equal to the distance between the outer plate members 34 and 35.

In addition to the cutting action exerted by the blades on the grain 33, a blower action will be created by the fan-like frontal surface of the angularly disposed blades 26 whereby the grain will be blown upwardly from the cut position into engagement with the apron 19, and thence upwardly through the loader assembly 15 for discharge as illustrated in FIGURE 1 into the wagon body 13. By virtue of the reversed spiral arrangement of the blades 26 the cut material is directed inwardly from each end of the shaft 20 for movement by the impeller action of the blades upwardly toward the central portion of the loader or chute assembly 15.

It is thus obvious to one skilled in the art that the invention comprises the improved chopper blade structure 26 having an offset flange to provide a shearing surface in combination with the angular mount thereof to the tubular bearing member 25. In this manner the planar surfaces of the blades 26 perform a dual function of carrying the cutter edges 30 and 32 into the grain to shear the grain, and also provide or create the upwardly directed draft whereby to convey the cut material through the loader 15 and into the wagon 13.

Obvious modifications to the structural details of the chopper blade and the mounting therefor comprising the invention described in this application and as set forth in the appended claims are deemed to be in the spirit and scope of such claims and the concepts of this application.

I claim:

1. In combination a cutter assembly, a loader assembly enclosing an arcuate portion of the cutter assembly for cutting material and then discharging the cut material into a material carrying body, said cutter assembly including a rotatable shaft unit, a plurality of blade members positioned in a row extended spirally about said shaft unit, each said blade member comprising a substantially triangular planar surface having an apex end and a base end, means pivotally connecting each said blade members at the apex end thereof to said shaft unit, with the base end of each blade member terminating in a laterally offset arcuate cutting lip, said planar surface being inclined relative to said shaft unit so as to constitute a leading face for a blade member and said cutting lip being projected from said leading face, whereby the cutting lip of each blade member will exert a shearing action on the material during a cutting operation and said planar surfaces will act as impeller blades to creat a forced draft to blow cut material from the cutting zone into the material carrying body.

2. The invention according to claim 1 wherein the blade members are mounted on the shaft unit in a spaced arrangement and are provided with an arcuate extent such that the cutting lips thereof, during operation, present a substantially continuous shearing blade of spiral formation to the material being cut.

3. The invention according to claim 1 wherein the blade members over one-half the length of said shaft unit have the planar surfaces thereof reversely inclined relative to the planar surfaces over the other half of said shaft unit.

References Cited in the file of this patent

UNITED STATES PATENTS

| | | |
|---|---|---|
| 898,256 | Olson | Sept. 8, 1908 |
| 2,501,925 | Yensen et al. | Mar. 28, 1950 |
| 2,506,054 | Agee et al. | May 2, 1950 |
| 2,864,223 | Lundell | Dec. 16, 1958 |
| 2,924,054 | Myers | Feb. 9, 1960 |
| 2,924,057 | Sonmore | Feb. 9, 1960 |